Figure 1:
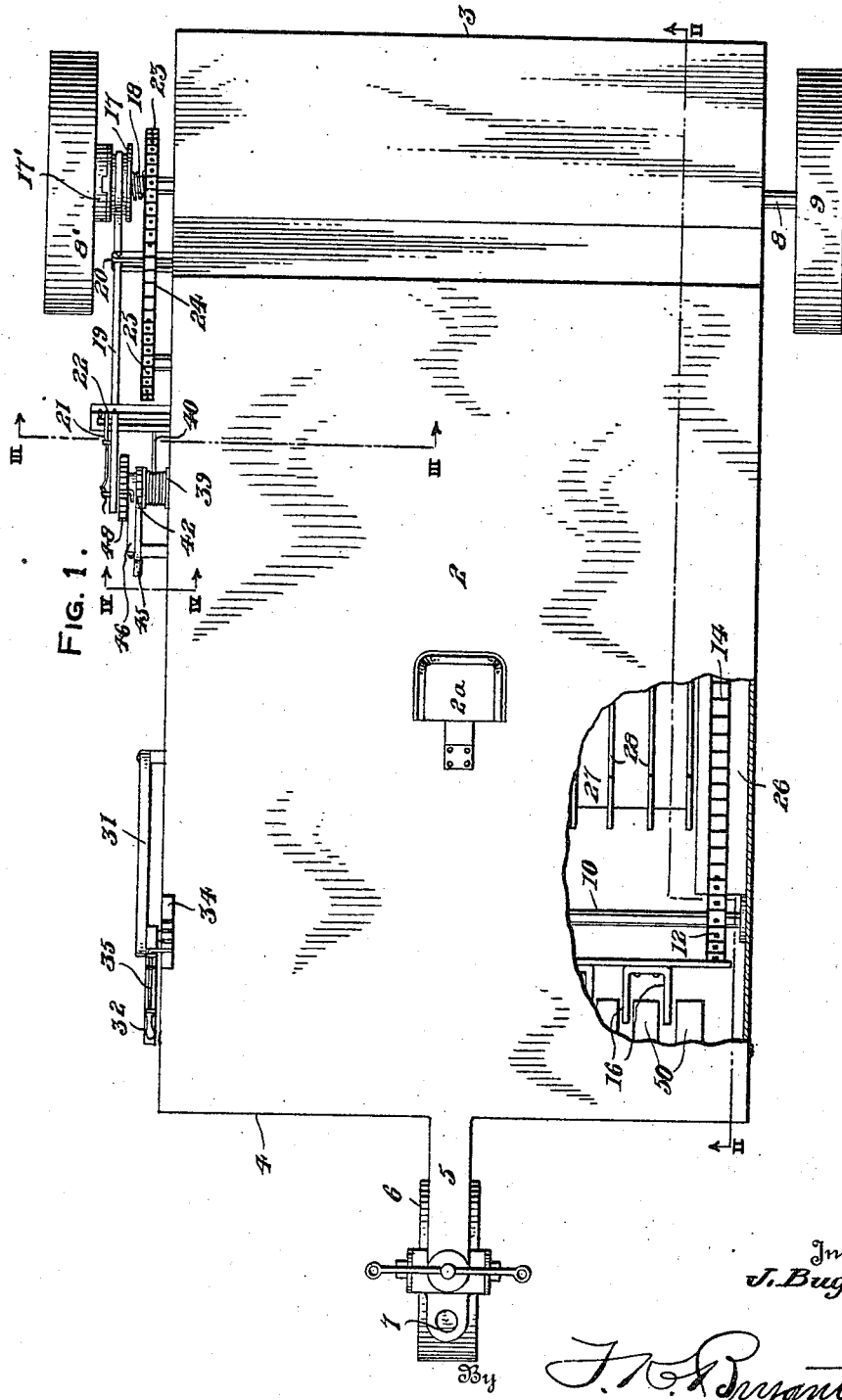

May 8, 1923.

J. BUGLA 1,454,668

STONE GATHERING MACHINE

Filed Oct. 20, 1921  3 Sheets-Sheet 1

Inventor
J. Bugla
By J. N. Bryant.
Attorney

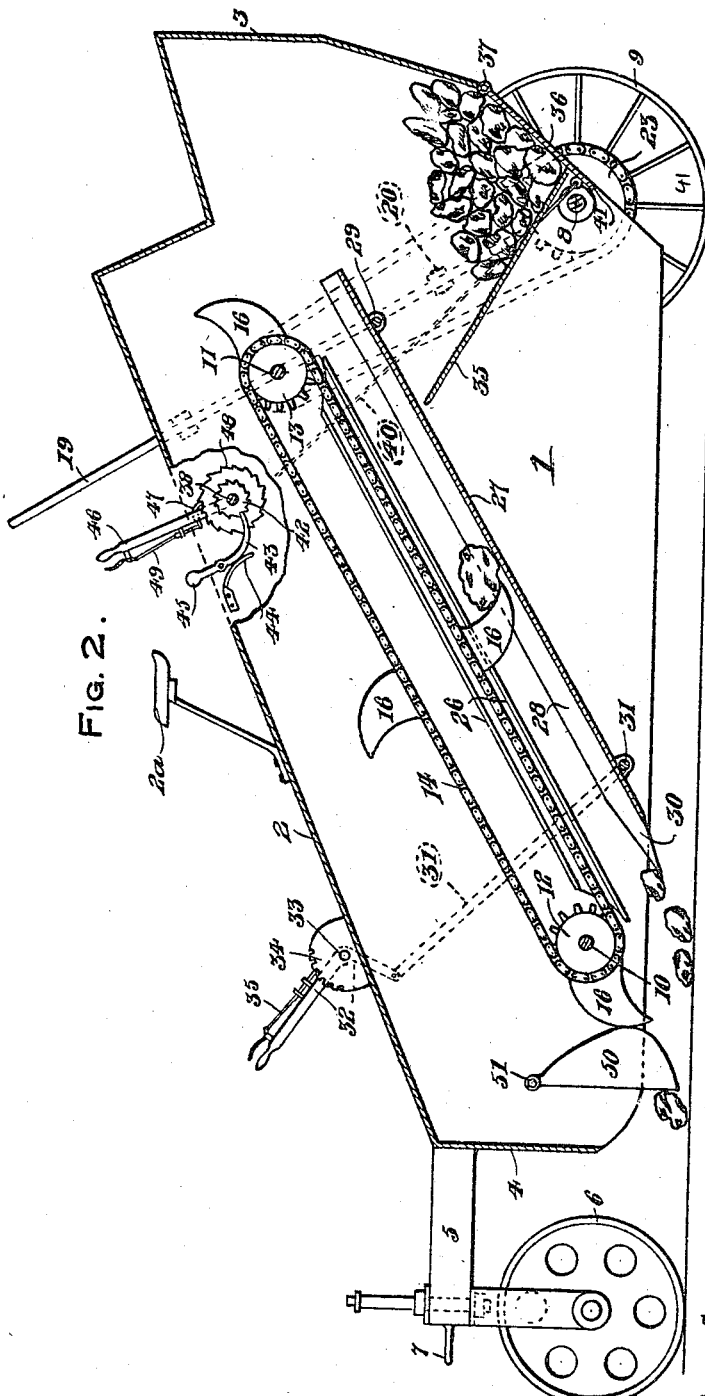

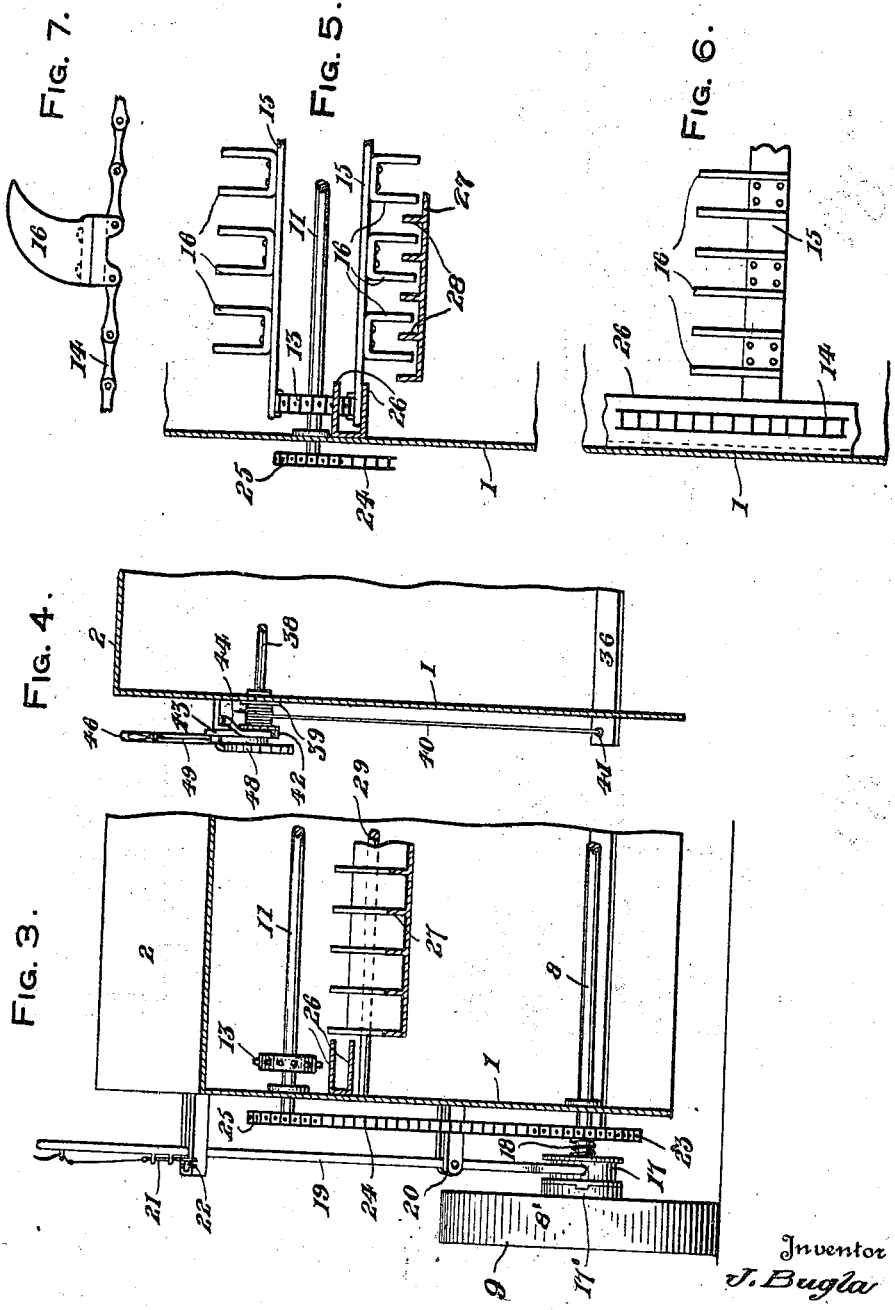

Patented May 8, 1923.

1,454,668

UNITED STATES PATENT OFFICE.

JOHN BUGLA, OF SAGINAW, MICHIGAN.

STONE-GATHERING MACHINE.

Application filed October 20, 1921. Serial No. 509,023.

*To all whom it may concern:*

Be it known that I, JOHN BUGLA, a citizen of Czechoslovakia, residing at Saginaw, in the county of Saginaw and State of Michigan, have invented certain new and useful Improvements in Stone-Gathering Machines, of which the following is a specification.

This invention relates to certain new and useful improvements in stone gathering machines and has particular reference to a machine embodying a casing supported on ground wheels with an endless conveyor and delivery chute for directing the gathered stones into a receptacle in the casing.

The primary object of the invention is to provide a stone gathering machine wherein a casing or body supported on ground wheels has an endless conveyor arranged therein with driving connections between the rear ground wheels and the conveyor, flights carried by the conveyor gathering the stones and feeding the same upwardly of an inclined platform or chute for reception in a receptacle adjacent the rear end of the machine.

A further object of the invention has reference to a stone gathering machine wherein an endless conveyor operated by the ground wheels of the machine are disposed above a pivotally mounted platform or chute with devices associated with the chute for varying the angularity thereof, guide fingers carried by the lower end of the chute being provided to direct the gathered stones or the like over the chute.

A still further object of the invention embodies in a stone gathering machine, a receptacle for the stones wherein the receptacle is provided with a hinged bottom wall controlled by cord and ratchet devices to regulate the opening and closing movement thereof.

With the above general objects in view and others that will become apparent as the nature of the invention is better understood, the same consists in the novel form, combination and arrangement of parts hereinafter more fully described, shown in the accompanying drawings and claimed.

In the drawings forming a part of this specification and in which like characters of reference indicate corresponding parts throughout the several views, Figure 1 is a top plan view partially broken away of a stone gathering machine constructed in accordance with the present invention, Figure 2 is a vertical longitudinal sectional view taken on line II—II of Figure 1 showing the endless chain conveyor, the pivoted chute, the device for regulating the angularity of the chute and the stone receptacle adjacent the rear end of the machine, Figure 3 is a detail sectional view taken on line III—III of Fig. 1, showing the driving connection between the ground wheels and power shaft of the endless conveyor, Figure 4 is a detail sectional view taken on line IV—IV of Figure 1 showing the cord and ratchet devices for controlling the opening and closing movements of the receptacle bottom, Figure 5 is a detail sectional view showing the cross bars of the endless chains supporting the flights with the flights shown in end elevation, Figure 6 is a detail sectional view showing the flights in top plan view, and Figure 7 is a fragmentary side elevational view of a portion of the endless chain showing the flight in side elevation.

Referring more in detail to the accompanying drawings, there is illustrated a stone gathering machine embodying a body section open at its lower side and having side walls 1, a top wall 2, and a rear wall 3, the front wall 4 carrying a bracket arm 5 for supporting a front steering ground wheel 6 while a clevis 7 carried by the bracket is provided for the attachment of a suitable draft device. A rear axle 8 extending transversely of the body at the rear end thereof supports rear ground wheels 9 as clearly shown in Figures 1 and 2. As shown in Figs. 1 and 2, an operator's seat 2ª is carried by the top wall of the machine.

A pair of shafts 10 and 11 for operating the endless conveyors are journaled respectively adjacent the front and rear ends of the machine, the shaft 10 being adjacent the ground line while the shaft 11 is positioned in proximity to the upper wall 2 as shown in Figure 2. A pair of sprocket wheels 12 and 13 are fixed to the opposite ends of the shafts 10 and 11 respectively and are traversed by conveyor sprocket chains 14.

The flights associated with the sprocket chains are shown more clearly in Figs. 2, and 5 to 7, a series of transverse bars 15 being connected at their ends to the chains and carrying spaced U-shaped flights 16 projecting outwardly thereof and arranged in spaced transverse series.

The driving connection for the conveyor chains embodies the provision of a clutch member 17 slidable upon the axle 8 and tensioned as at 18 for engagement with a companion clutch member 17′ fixed to the adjacent ground wheel 8 as shown in Figure 3, the sliding clutch 17 being shifted by the fork lever 19 pivotally mounted in brackets 20 carried by the adjacent side wall 1 of the body with the tensioned latch 21 cooperating with the rack segment 22 to be held in either open or closed position. A gear wheel 23 fixed to the axle section 8 outwardly of the body as shown in Figure 3 is traversed by a sprocket chain 24 that engages a sprocket wheel 25 upon the shaft 11 for rotating said shaft. Rotary motion of the shaft 11 is communicated to the shaft 10 by the provision of sprocket wheels 12 and 13 fixed to the shafts 10 and 11 and traversed by the sprocket chains 14 shown in Figures 1 and 2 with the lower ply of the chain passing between guide flanges 26.

A receiving and delivering chute is arranged within the body and disposed beneath the endless conveyors and includes an inclined bottom wall 27 carrying spaced perpendicular flanges 28 with the upper end of the chute pivoted as at 29 between the side walls 1 of the body, this construction being clearly shown in Fig. 2, the lower ends of the flanges projecting beyond the lower end of chute and pointed to provide prongs or fingers 30 for directing the stones into the channels between the flanges 28. The chute is disposed with relation to the conveyor chains to cause the flights 16 to straddle the flanges and travel within the channels provided by the flanges 28.

In order to vary the angularity of the chute 27 with respect to the conveyor chains and also to regulate the position of the fingers 30 relative to the ground line, a system of levers is associated with the lower forward swinging end of the chute and is shown more clearly in Figures 1 and 2, a shaft 31 being secured to the bottom wall of the chute 27 and having connected to one end thereof, a relatively long lever with the upper end of the lever pivoted to one leg of a bell-crank lever 32, the bell crank being pivoted at 33 to the segment rack 34, a latch rod 35 carried by the bell-crank and cooperating with the segment to hold the same in adjusted position. It will therefore be seen that upon shifting movement of the bell crank, the chute 27 is correspondingly pivotally moved for varying the angularity thereof.

A receptacle for the gathered stones is disposed within the body adjacent the rear wall 3, a partition 35 extending transversely of the side walls 1 as shown in Figure 2 being engaged at its lower end by the bottom wall 36 hinged as at 37 to the rear wall 3 while adjustable connections for the forward free edge of the bottom wall are provided and as more clearly shown in Figures 2 and 4, the adjustable connections include a shaft 38 journaled between the side walls 1 of the body with one end extending outwardly of the body and having a cable drum 39 fixed thereto upon the outer projecting end, the upper end of the cable 40 being secured to the drum 39 and wound thereon while the lower end is connected as at 41 to the forward freely swinging end of the bottom wall 36. A ratchet wheel 42 fixed to the shaft 34 adjacent the drum 39 is engaged by the hook lever 43 and maintained so engaged by the spring 44, the handle 45 of the lever being gripped for disengaging the lever from the ratchet wheel 42 when it is desired to permit the bottom wall 36 to move to an open position. In closing the bottom 36 of the stone receptacle, the lever 46 journaled on the shaft 38 has a tensioned dog 47 adapted to be moved into engagement with the ratchet wheel 48 by the tensioned rod 49, the lever rotating the ratchet wheel 48 and the shaft 38 carrying the drum 39, the lever 43 preventing a reverse movement of the shaft 38 and drum 39 by engaging the ratchet wheel 42.

A plurality of weighted arms 50 pivotally mounted on the shaft 51 are alined transversely of the forward end of the body and are adapted for disengaging the stones to be gathered from the ground, the arms of the U-shaped flights 16 passing between the weighted arms 50.

From the above detailed description of the device, it is believed that the construction and operation thereof will at once be apparent, it being noted that power for operating the endless chains 14 is derived from the rear axle section 8 and communicated to the shaft 11 by the sprocket chain 24, rotation of the shaft 11 being communicated to the shaft 10 by the chains 14 shown more clearly in Figures 1 and 2. The endless chains 14 passing over the gears 12 and 13 secured to the shafts 10 and 11 carry the flights 16 for gathering the stones and delivering the same upwardly of the chute 27 between the guide flanges 28 into the receptacle at the rear end of the machine body. The weighted arms 50 will loosen the stones from the ground and permit the flights 16 to readily gather the same in an obvious manner. The operation of the endless conveyors is controlled by the clutch members 17 and 17′ operated by the lever 19 while the angularity of the chute 27 is also regulated by the lever 32 having the bell crank and lever connection with the forward free swinging end thereof. The dumping of the receptacle is accomplished by releasing the lever 43 by the handle portion 45 to disengage the hooked end thereof from the ratchet wheel 42 whereupon the weight of the stones in the receptacle will cause the bottom 36 to be lowered. In closing the bottom wall of the receptacle, the tensioned dog 47 is moved into engagement with the ratchet wheel 48 to rotate the shaft 38 and wind the cable 40 upon the drum 39, retrograde movement of the drum being prevented by the locking lever 43 engaging the ratchet wheel 42. Any means may be employed as a draft for the machine and attached to the clevis 7, either horse or motor power.

While there is herein shown and described the preferred embodiment of the invention, it is nevertheless to be understood that minor changes may be made without departing from the spirit and scope of the invention as claimed.

What is claimed as new is:—

1. In a stone gathering machine, the combination with a wheeled vehicle on which a body is supported, of an angularly adjustable chute forwardly of and communicating at its rear end with a receptacle within the body, endless conveyors supported within the body and cooperating with said chute for conveying the stones thereon, and means forwardly of the conveyors and chute for disengaging the stones from the ground, said means comprising a plurality of weighted arms pivotally mounted upon a transverse shaft within the body.

2. A stone gathering machine embodying a body, front and rear supporting wheels therefor, endless conveyors supported in the body, driving connections between the rear wheels and the endless conveyors, an angularly adjustable chute disposed beneath the endless conveyors, and weighted arms arranged transversely of the machine forwardly of the conveyor and chute.

In testimony whereof I affix my signature.

JOHN BUGLA.